United States Patent
Graupner et al.

(10) Patent No.: US 7,349,965 B1
(45) Date of Patent: *Mar. 25, 2008

(54) AUTOMATED ADVERTISING AND MATCHING OF DATA CENTER RESOURCE CAPABILITIES

(75) Inventors: Sven Graupner, Mountain View, CA (US); Vadim Kotov, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 717 days.

This patent is subject to a terminal disclaimer.

(21) Appl. No.: 10/243,342

(22) Filed: Sep. 13, 2002

(51) Int. Cl.
*G06F 15/16* (2006.01)
*G06F 15/173* (2006.01)

(52) U.S. Cl. .................. 709/226; 709/219; 709/229

(58) Field of Classification Search ........ 709/223–229, 709/217–219; 455/456.1–456.3; 707/1–10
See application file for complete search history.

(56) References Cited

U.S. PATENT DOCUMENTS

| | | | | |
|---|---|---|---|---|
| 5,896,503 A * | 4/1999 | Badovinatz et al. | ........ | 709/201 |
| 6,198,479 B1 * | 3/2001 | Humpleman et al. | ....... | 715/733 |
| 6,360,260 B1 * | 3/2002 | Compliment et al. | ....... | 709/224 |
| 6,418,486 B1 * | 7/2002 | Lortz et al. | .................. | 710/10 |
| 6,574,655 B1 * | 6/2003 | Libert et al. | ................ | 709/200 |
| 6,581,094 B1 * | 6/2003 | Gao | ........................... | 709/220 |
| 6,772,162 B2 * | 8/2004 | Waldo et al. | .................. | 707/10 |
| 6,813,501 B2 * | 11/2004 | Kinnunen et al. | ....... | 455/456.2 |
| 6,826,606 B2 * | 11/2004 | Freeman et al. | ........... | 709/223 |
| 6,854,013 B2 * | 2/2005 | Cable et al. | ................ | 709/226 |
| 6,950,875 B1 * | 9/2005 | Slaughter et al. | ........... | 709/230 |
| 7,054,650 B2 * | 5/2006 | Bohmer et al. | .......... | 455/456.3 |
| 7,065,579 B2 * | 6/2006 | Traversat et al. | ........... | 709/230 |
| 2002/0062375 A1 * | 5/2002 | Teodosiu et al. | ........... | 709/226 |
| 2002/0103907 A1 * | 8/2002 | Petersen | ..................... | 709/226 |
| 2002/0184311 A1 * | 12/2002 | Traversat et al. | ........... | 709/204 |
| 2003/0023705 A1 * | 1/2003 | Kim | .......................... | 709/220 |
| 2003/0152040 A1 * | 8/2003 | Crockett et al. | ............ | 370/260 |
| 2003/0154249 A1 * | 8/2003 | Crockett et al. | ............ | 709/204 |
| 2004/0003058 A1 * | 1/2004 | Trossen | ...................... | 709/220 |

OTHER PUBLICATIONS

Mockapetris, P., "Domain Names—Implementation and Specification" RFC 1035, Nov. 1987.*
UDDI: Standardization Effort on *Universal Description, Discovery and Integration (UDDI) of businesses in the Web,* http://www.uddi.org.
Kotov, V.: On Virtual Data Centers and Their Operating Environments, HP Labs Technical Report, HPL-2001-44, Mar. 2001.
Raman, Rajesh, Livny, Miron, Soloman, Marvin, "Matchmaking: Distributed Resource Management for High Throughput Computing", 1998.

* cited by examiner

*Primary Examiner*—Joseph E. Avellino

(57) ABSTRACT

Method and apparatus for automated advertising and matching capabilities of data centers. In various embodiments, respective capability data sets are registered with a computing arrangement for one or more capability descriptors of a plurality of data centers. Each capability data set indicates resources available at and offered by the associated data center. To determine the capabilities available from other data centers, a data center, a user, a user's application or a data center operator submits a query to the computing arrangement. The query indicates capability requirements of the requesting data center. The computing arrangement responds with the capability data sets that match the query.

23 Claims, 3 Drawing Sheets

AUTOMATED ADVERTISING AND MATCHING OF DATA CENTER RESOURCE CAPABILITIES

FIELD OF THE INVENTION

The present invention generally relates to grid computing arrangements, and more particularly to matching the needs and capabilities of data centers in a grid computing arrangement.

BACKGROUND

The grid computing model treats resources of computing systems in a manner analogous to the way in which a power grid supplies electricity. In the grid computing model, multiple data centers collectively provide resources to various users. The users are generally unaware of the identity of the particular data center providing a resource in much the same way that users of electricity are unaware of which power generators are currently contributing to the local power supply.

Situations may arise where users' demands on a data center exceed or are different from the capabilities of one data center. For example, a business user's data storage needs are likely to grow as the user's business grows. In this situation additional storage resources must be found to meet the user's needs. Rather than physically expand the resources of one data center to meet growing needs, other data centers are called upon to provide the necessary resources. A similar situation may arise in the services that are provided by data centers and the services needed by clients.

Current methods for matching resource demands with resource supplies in data centers are often managed by operators. Users of applications interact with human operators in order to request additional resources or release unneeded resources. Thus, it is left to operators to recognize and respond to changes in resource requirements and capabilities in data centers. Operators, however, in responding to resource requests may have difficulty finding optimal matches in large combinatorial allocation spaces. Furthermore, manually managing the resource allocations of data centers presents large operation costs and creates the risk of human-introduced errors. Errors in resource allocation may affect the availability of resources and entire data centers, and also result in lost revenue.

Further complicating the management of resources allocated between data centers is the exchange of information that describes the resources and requirements. Not only must steps be taken to initially establish relationships between data centers, but the exchange of information between data centers requires an agreed-upon format for the information—possibly leading to quadratic growth in information exchange formats. The manager of data center resource information must also devise a way to keep the information current so that decisions are not made based on dated and inaccurate information.

A system and method that address the aforementioned problems and automates the matching of resource demands with resource supplies, as well as other related problems, are therefore desirable.

SUMMARY OF THE INVENTION

The present inventions provides data centers with the ability to advertise resource capabilities and identify those data centers having desired resource capabilities. In various embodiments, respective capability data sets describing data center resource capabilities are registered with a computing arrangement for one or more of a plurality of data centers. Each capability data set indicates resources available at the associated data center. To determine the capabilities available from other data centers, an inquirer, such as a data center's automated resource management system, an operator, a user, or a user's application, submits a query to the computing arrangement. The query indicates capability requirements of the inquirer. The computing arrangements responds with the capability data sets that match the query and an address for contact should the inquirer choose to make use of these capabilities.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

In various embodiments, an arrangement is provided for advertising capabilities of data centers to other data centers. The invention supports establishing a federated inter-data-center control system by way of capability advertisements and processing of resource inquiries. The capability advertisements specify resources that are available in the data centers, and the inquiries specify resources that are sought. The matching of advertisements to inquiries is automated, which avoids the need to individually configure relationships amongst the data centers. Different embodiments of the invention can be built using existing infrastructure to support the advertising and inquiry processing.

Figure 1:
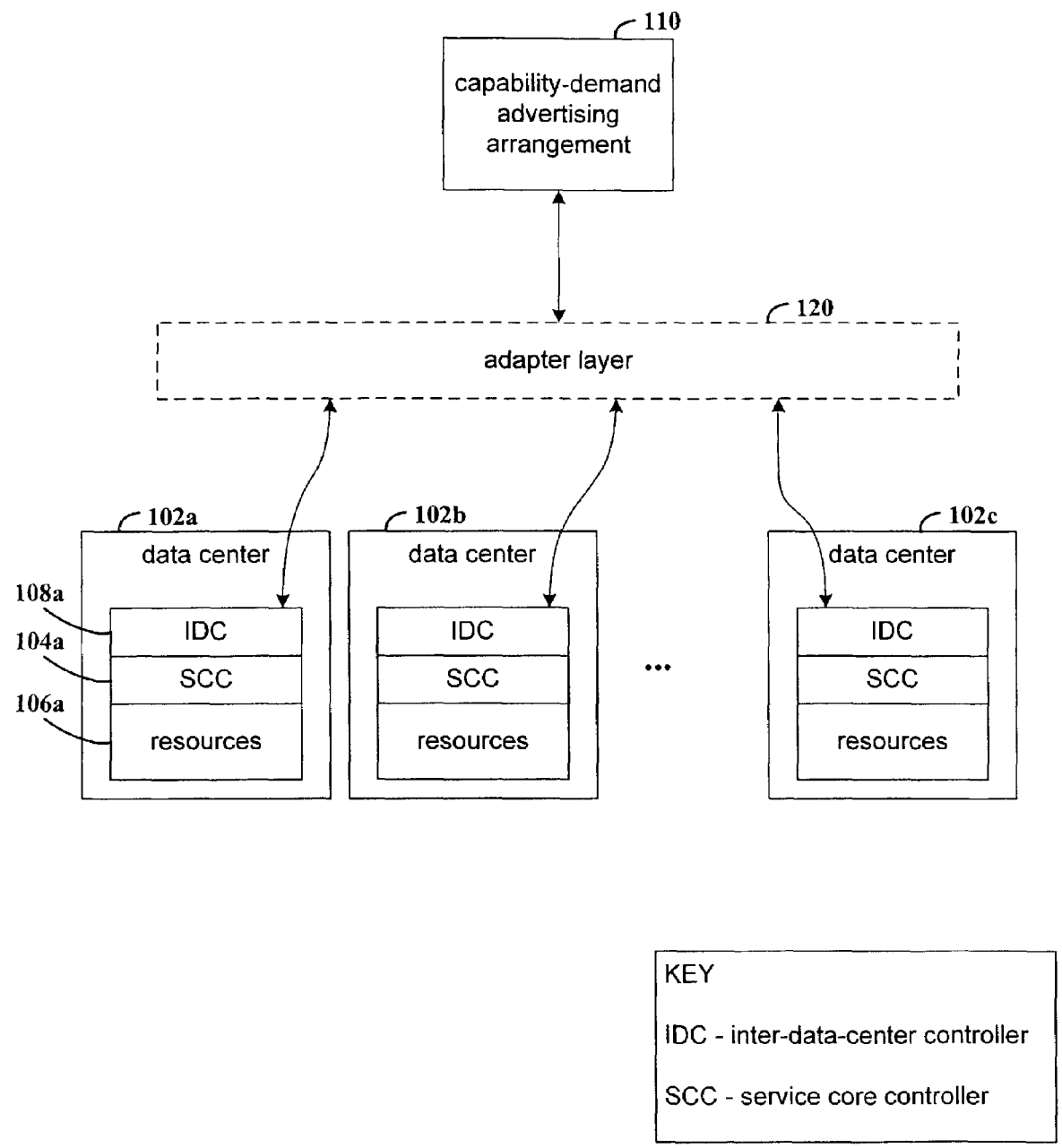
FIG. 1 is a functional block diagram of an example grid data center computing arrangement in accordance with one embodiment of the invention.

FIG. 1 is a functional block diagram of an example grid computing data center arrangement in accordance with one embodiment of the invention. The example arrangement includes multiple data centers 102a-102c. Each data center provides computing resources ranging from, for example, application-specific software services to hardware resources such as storage arrays. In an example embodiment, controller software in each data center provides tools for planning, designing, and managing resources of the data center. An example data center also includes a management hardware/software subsystem that determines and saves the topology of and resources in the data center. Example resources in the data center include servers, storage arrays, a network operations center/portal/integrated service subsystem, and various service applications. Resources may even be extended into software services a data center may offer.

Each data center includes a service core controller (SCC) that is responsible for managing the resources within the data center. For example, data center 102a includes SCC 104a, which manages the resources 106a. An inter-data-center controller (IDC) in each data center extends the functions of the SCC to include reallocating resources between data centers, rerouting and distributing load between data centers, and re-balancing service allocation arrangements between data centers in response to fluctuations in demand. IDC 108a is the inter-data-center controller for data center 102a. The IDCs are intercoupled via a network (not shown).

The IDCs in each of the data centers are coupled to a capability-demand advertising arrangement 110. In an example embodiment, the advertising arrangement is responsible for registering descriptions of the capabilities ("capability descriptors") of the data centers as submitted by the IDC components. The capability descriptors are registered for a certain period of time ("lease period") to keep the advertised capabilities current relative to the actual capabilities at the data centers. In addition, if a data center is temporarily unavailable and the lease expires, the data center can submit a new capability descriptor when the data center is available, which allows the data center to rejoin the federation. The advertising arrangement also provides an interface that allows each data center to query the registered advertisments using a query descriptor (QD). In addition, each data center may withdraw an advertisement before the corresponding lease expires, or renew the lease for certain period of time.

There are various infrastructures that are available to implement the capability-demand advertising arrangement. The infrastructure selected for a particular implementation will depend on design requirements. Example infrastructures include: well-known portals, bulletin boards or web sites that manage advertisements; universal description and discovery infrastructures comprised of a multitude of registry servers; enterprise directories, for example, X.500-based directories or LDAP directories; public or enterprise-wide search engines; and T-Spaces or Java-Spaces. With each infrastructure, the access point is known to each IDC.

In another embodiment, an adapter layer 120 translates advertising information to a capabilities descriptor of a format that is compatible with the advertising arrangement 110. The adapter layer hides specifics of the underlying implementation of the advertising arrangement from the IDC components and provides a generalized abstraction of how the capability descriptors and query descriptors can be described independent of the underlying implementation. This allows each data center to advertise and query for capabilities in a way that is independent of the manner used by the other data centers. Thus, the adapter layer eliminates the need for a priori agreements. The adapter layer is implemented at the level required by implementation requirements. For example, the adapter layer may be implemented at each data center within either the IDC or SCC components, or centrally within the topology.

Figure 2:
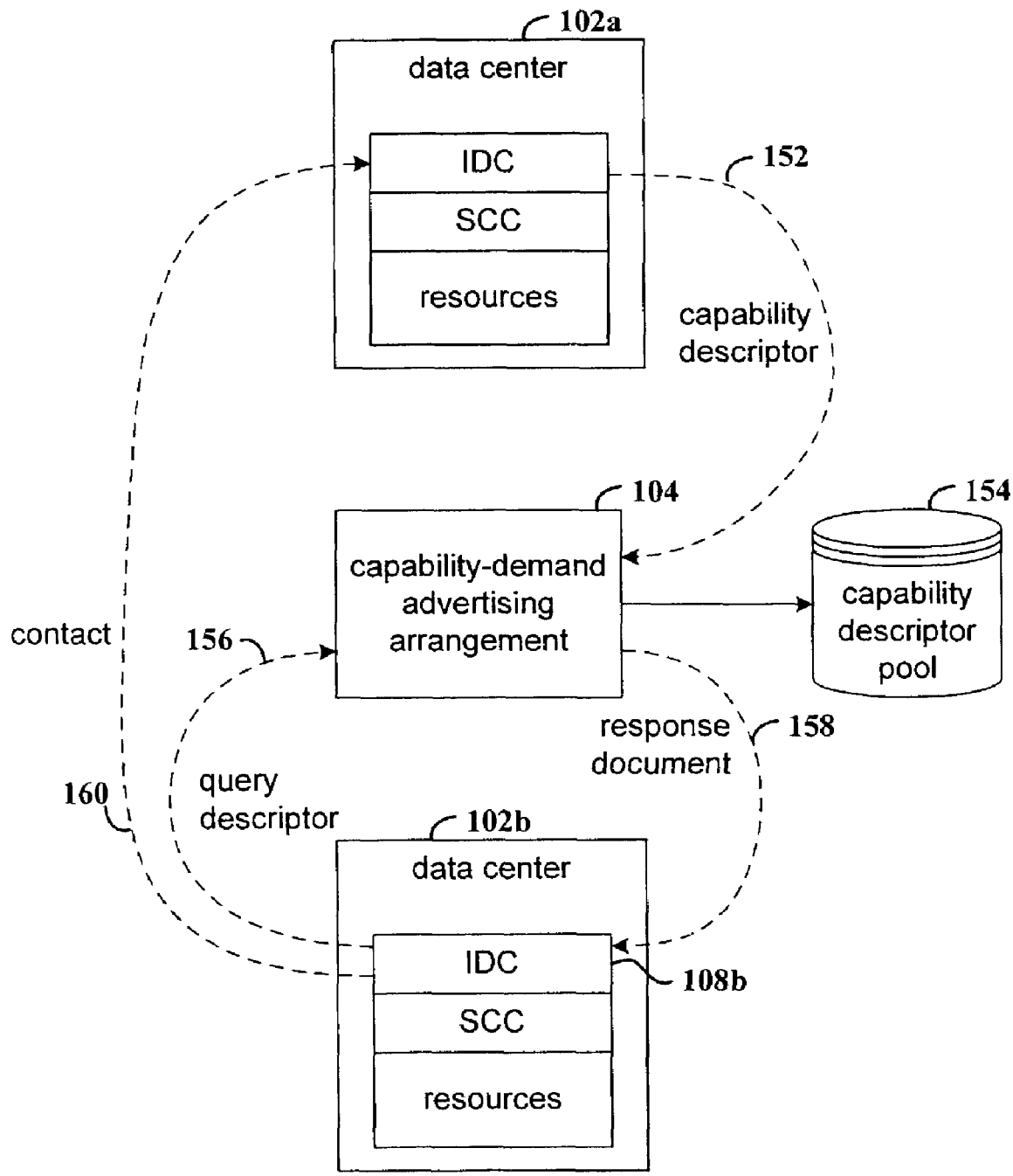
FIG. 2 illustrates an example data flow in advertising and querying the resource capabilities of a data center and establishing contact between an offering and inquiring data center.

FIG. 2 illustrates an example data flow in advertising the resource capabilities of a data center. The description of the data flow begins with the IDC of data center 102a transmitting a capability descriptor (line 152) to the capacity-demand advertising arrangement 104. The capability descriptor describes the capabilities of data center 102a. Upon receiving a capability descriptor, the advertising arrangement adds the capability descriptor to a pool 154 of capability descriptors. Data center 102b submits a query descriptor (line 156) to the advertising arrangement when a need arises to determine whether any of the data centers participating with the advertising arrangement have a desired capability. The query descriptor includes a list of elements and associated attributes that may be present in a capability descriptor. The advertising arrangement searches the pool of capability descriptors for those having attributes that match the attributes in the query descriptor. A response document, containing the capability descriptors that satisfy the query, is returned (line 158) to the data center 102b that submitted the query. Data center 102b uses the information in the response document to identify a data center having the capabilities that best meets its resource needs. The IDC component 108b of data center 102b initiates contact (line 160) with the data center 102a that best meets the resource needs.

The following paragraphs describe an example implementation of a capability descriptor, a query descriptor, and a results document. A capability descriptor is a structured attribute-value list with mandatory attributes and optional attributes. In the presented example, XML syntax is used. The attribute-value list is structured in that the values may be literal values or further attribute-value lists such that the overall structure forms a tree (recursive list of lists). The attributes include a name, an identifier, a data center location description, an access reference to the data center (for example, a URL), a lease period, and an access code (for example, a key to establish secure communication). Depending on the particular data center, additional attributes include descriptions of the capabilities of the data center such as the machines that are available for use, preconfigured software, operational policies, constraints and other characteristics.

The following code segment illustrates an example capability descriptor (CD).

```
<CD name="PaloAltoDC" id="PACAUS">
  <location>                              <!-- mandatory section -->
    Palo Alto, 1501 Page Mill Rd., California, USA
  </location>
  <accessor url="http://sos.hpl.hp.com:8081/ma439" />
  <lease expires="03/25/2002, 12:00" autorenewal="false" />
  <accesscode>
    mQCNAi9cjl0AAAEEALyqJl0YFI+HHpCqgovzSSWd7glJ/
    tCBtHfGZn01EQ//PXT5
  </accesscode>
  <!-- ------------------------------------ -->   <!-- optional section -->
  <resources>
    <server>
      <server class="lpr2000" num="256" />
      <server class="lpr2000" num="64" />
    </server>
    <storage>
      <storage class="XP512" num="4">
        <capacity>250</capacity>
      </storage>
    </storage>
    <service>
      <service class="DCfarm">
        <farm name="EmployeePortalFarm" ref="http:// . . . " />
      </service>
    </resources>
</CD>
```

A query descriptor (QD) contains a list of elements with attributes that may occur in the registered capability descriptor. The list may be related to mandatory or optional elements of the capability descriptor. The example query descriptor set forth in the code below represents a query that specifies a capability descriptor that advertises "16 lpr2000" machines with a 100 giga-byte storage block located in Palo Alto. Wildcard characters such as "*" and "?", as well as regular expressions, can be used for matches.

```
<QD>
    <location>*Palo*Alto*</location>        <!-- query attributes in
                                                 mandatory fields -->
    <!-- ----------------------------- -->
    <server class="lpr2000" num="16" /> >    <!-- query attributes in
                                                 optional fields -->
    <storage class="*" capacity="100" />
</QD>
```

In an alternative embodiment, standard XML techniques for extracting information from capability descriptor documents can be used to formulate queries. The presence of specified information is interpreted as a match. Example XML techniques for describing and extracting selected information from XML documents include, for example, XPath or XQuery.

The response document includes a list of capability descriptors having attributes that match the attributes specified in the query descriptor. The code below illustrates an example response document (RD).

Figure 3:
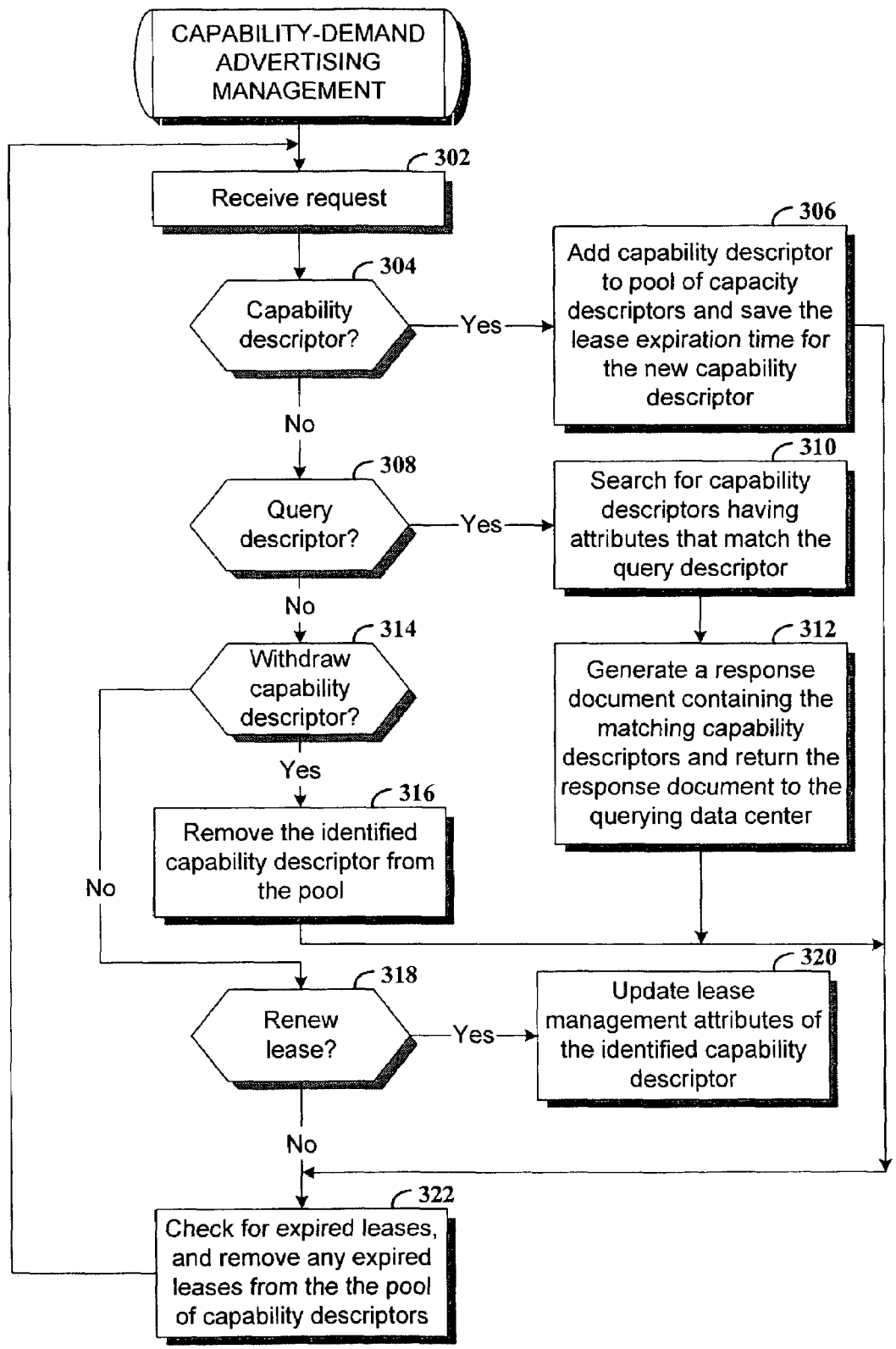
FIG. 3 is a flowchart of an example process for managing capability advertising in accordance with an example embodiment of the invention.

```
<RD>
    <CD name="PaloAltoUDC" id=    <!-- first matching CD, e.g. the one
    "PACAUS">                          from -->
        . . .                     <!-- FIG. 3                      -->
    </CD>
    <CD . . . > . . .             <!-- second matching CD -->
    </CD>
    . . .
</RD>
```

FIG. 3 is a flowchart of an example process for managing capability advertising in accordance with an example embodiment of the invention. When the advertising arrangement receives a request from a data center (step 302), the type of request dictates the action taken. If the request is a capability descriptor (decision step 304), the capability descriptor is added to the pool of capability descriptors, and a timestamp ("lease expiration time") is saved in association with the capability descriptor (step 306).

If the request is a query descriptor (decision step 308), the pool of capacity descriptors is searched for capacity descriptors having attributes that match the attributes in the query descriptor (step 310). A response document with the matching capacity descriptors is generated and returned to the inter-data-center controller that submitted the query (step 312).

If the request is for withdrawal of a capability descriptor (decision step 314), the identified capability descriptor is removed from the pool (step 316). If the request is to renew (or extend) a lease for a capability descriptor (decision step 318), the lease-management attributes, for example, the lease expiration time, of the capability descriptor are updated (step 320).

Periodically, the advertising arrangement checks for capability descriptors having expired leases (step 322). When the lease expires, the capability descriptor is removed from the pool. It will be appreciated that even though the example process shows that leases are checked after processing each request, the check could alternatively be part of a separate process or performed before each request is processed.

The present invention is believed to be applicable to a variety of systems for exchanging information describing the capabilities of data centers and has been found to be particularly applicable and beneficial in grid computing arrangements. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method of advertising capabilities of data centers, comprising:
   registering respective capability data sets to a computing arrangement for a plurality of data centers, wherein each capability data set indicates resources available at one of the data centers;
   wherein the resources include hardware and software resources, and at least one of the capability data sets specifies respective numbers of servers in two or more classes of servers and a quantity of storage;
   wherein each capability data set includes a subset that has mandatory information and a subset that has optional information, wherein the mandatory information includes at least a data center identifier and the optional information specifies each resource available at the data center identified by the identifier;
   receiving queries at the computing arrangement from one or more of the plurality of data centers;
   wherein each query specifies information to be matched to at least one of the mandatory information and the optional information of the plurality of capability data sets;
   wherein at least one of the queries specifies a number of servers in a class of servers and a quantity of storage; and
   providing in response to a query, each registered capability data set that matches the query.

2. The method of claim 1, further comprising selecting a data center from the capability data sets provided to the querying data center.

3. The method of claim 1, further comprising:
   maintaining for each capability data set a registration for up to a selected maximum period of time that defines a lease period; and
   removing a registered capability data set in response to expiration of the lease period for the capability data set.

4. The method of claim 3, further comprising withdrawing registration of a capability data set before expiration of an associated lease period in response to a request from the data center associated with the capability data set.

5. The method of claim 3, further comprising extending the lease period of a capability data set in response to a request from the data center associated with the capability data set.

6. The method of claim 1, further comprising converting each capability data set from a first format to a second format prior to registration with the computing arrangement.

7. The method of claim 6, further comprising converting each query from a third format to a fourth format compatible with the computing arrangement.

8. The method of claim 1, wherein each capability data set includes a data center identifier.

9. The method of claim 1, wherein each capability data set includes data that indicate addressing information of the data center associated with the capability data set.

10. The method of claim 1, wherein at least one capability data set includes data that describe one or more service descriptions.

11. The method of claim 10, wherein at least one query includes data that describe one or more service descriptions.

12. An apparatus for advertising capabilities of data centers, comprising:
    means for registering respective capability data sets to a computing arrangement for a plurality of data centers, wherein each capability data set indicates resources available at a data center;
    wherein the resources include hardware and software resources, and at least one of the capability data sets specifies a number of servers in each class of servers and a quantity of storage;
    wherein each capability data set includes a subset that has mandatory information and a subset that has optional information, wherein the mandatory information includes at least a data center identifier and the optional information specifies each resource available at the data center identified by the identifier;
    means for receiving queries at the computing arrangement;
    wherein each query specifies information to be matched to at least one of the mandatory information and the optional information of the plurality of capability data sets;
    wherein at least one of the queries specifies a number of servers in a class of servers and a quantity of storage; and
    means for providing to a querying data center, in response to a query submitted by the querying data center, each capability data set that matches the query.

13. A computing system, comprising:
    a network;
    a plurality of data centers coupled to the network, each data center having a respective set of resources and configured with a resource controller that generates capability data sets, wherein each capability data set indicates resources available at the data center for use by one or more others of the data centers;
    wherein the resources include hardware and software resources, and at least one of the capability data sets specifies a number of servers in each class of servers and a quantity of storage;
    wherein each capability data set includes a subset that has mandatory information and a subset that has optional information, wherein the mandatory information includes at least a data center identifier and the optional information specifies each resource available at the data center identified by the identifier;
    an advertising computing arrangement coupled to the data centers, the advertising computing arrangement configured to register the capability data sets received from the data centers, and provide in response to a query the capability data sets that match the query, wherein each query specifies information to be matched to at least one of the mandatory information and the optional information of the plurality of capability data sets; and
    wherein at least one of the queries specifies a number of servers in a class of servers and a quantity of storage.

14. The system of claim 13, wherein the advertising computing arrangement is further configured to maintain for each capability data set a registration for up to a selected maximum period of time that defines a lease period, and remove a registered capability data set in response to expiration of the lease period for the capability data set.

15. The system of claim 14, wherein the advertising computing arrangement is further configured to withdraw registration of a capability data set before expiration of an associated lease period in response to a request from the data center associated with the capability data set.

16. The system of claim 14, wherein the advertising computing arrangement is further configured to extend the lease period of a capability data set in response to a request from the data center associated with the capability data set.

17. The system of claim 13, further comprising a format converter coupled to the resource controllers and to the advertising computing arrangement, the format converter configured to convert each capability data set from a first format to a second format prior to registration with the advertising computing arrangement.

18. The system of claim 17, wherein the format converter is further configured to convert each query from a third format to a fourth format compatible with the advertising computing arrangement.

19. The system of claim 13, wherein each capability data set includes a data center identifier.

20. The system of claim 13, wherein each capability data set includes data that indicate addressing information of the data center associated with the capability data set.

21. The system of claim 13, wherein at least one capability data set includes data that describe one or more service descriptions.

22. The system of claim 21, wherein at least one query includes data that describe one or more service descriptions.

23. An article of manufacture, comprising:
    a computer readable medium configured with instructions for causing a computer to perform the steps of,
        registering respective capability data sets to a computing arrangement for a plurality of data centers, wherein each capability data set indicates resources available at a data center;
        wherein the resources include hardware and software resources, and at least one of the capability data sets specifies a number of servers in each class of servers and a quantity of storage;
        wherein each capability data set includes a subset that has mandatory information and a subset that has optional information, wherein the mandatory information includes at least a data center identifier and the optional information specifies each resource available at the data center identified by the identifier;
        receiving queries at the computing arrangement;
        wherein each query specifies information to be matched to at least one of the mandatory information and the optional information of the plurality of capability data sets;
        wherein at least one of the queries specifies a number of servers in a class of servers and a quantity of storage; and
        providing to a querying data center, in response to a query submitted by the querying data center, each capability data set that matches the query.

* * * * *